US012652602B2

(12) United States Patent
Balasubramanian et al.

(10) Patent No.: US 12,652,602 B2
(45) Date of Patent: Jun. 9, 2026

(54) ADAPTIVE TRANSMISSION AND TRANSMISSION PATH SELECTION BASED ON PREDICTED CHANNEL STATE

(71) Applicant: QUALCOMM Incorporated, San Diego, CA (US)

(72) Inventors: Anantharaman Balasubramanian, San Diego, CA (US); Shuanshuan Wu, San Diego, CA (US); Kapil Gulati, Belle Mead, NJ (US); Kyle Chi Guan, New York, NY (US); Himaja Kesavareddigari, Bridgewater, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 218 days.

(21) Appl. No.: 17/305,119

(22) Filed: Jun. 30, 2021

(65) Prior Publication Data

US 2023/0007564 A1 Jan. 5, 2023

(51) Int. Cl.
*H04W 40/18* (2009.01)
*G06N 5/04* (2023.01)
(Continued)

(52) U.S. Cl.
CPC .............. *H04W 40/18* (2013.01); *G06N 5/04* (2013.01); *G06N 20/00* (2019.01); *H04B 17/3913* (2015.01); *H04L 1/0001* (2013.01)

(58) Field of Classification Search
CPC . H04W 40/18; H04W 52/146; H04W 52/223; H04W 52/241; H04W 52/246;
(Continued)

(56) References Cited

U.S. PATENT DOCUMENTS 11,966,396 B1 4/2024 Finnerty et al.
2004/0218561 A1* 11/2004 Obuchi ................. H04L 1/1867
370/328
(Continued)

FOREIGN PATENT DOCUMENTS

CN 105474668 A 4/2016
CN 110138475 A 8/2019
(Continued)

OTHER PUBLICATIONS

Abu A.M., et al., "Machine Learning in Wireless Sensor Networks: Algorithms, Strategies and Applications", IEEE Communications Surveys Tutorials, vol. 16, No. 4, Apr. 24, 2014 (Apr. 24, 2014), pp. 1996-2018, XP011565128, 24 Pages, DOI: 10.1109/COMST.2014. 2320099 [Retrieved on Nov. 20, 2014] Abstract.
(Continued)

*Primary Examiner* — Lana N Le
(74) *Attorney, Agent, or Firm* — Harrity & Harrity, LLP

(57) ABSTRACT

Various aspects of the present disclosure generally relate to wireless communication. In some aspects, a transmitter node may predict a future state associated with a wireless channel at a future time instance using a machine learning model, wherein the future state is predicted based at least in part on one or more of weights associated with the machine learning model, a current state associated with the wireless channel, or one or more previous states associated with the wireless channel. The transmitter node may select one or more parameters for a transmission to occur at the future time instance based at least in part on the future state associated with the wireless channel. The transmitter node may perform the transmission using the one or more parameters. Numerous other aspects are described.

30 Claims, 8 Drawing Sheets

(51) Int. Cl.
  *G06N 20/00* (2019.01)
  *H04B 17/391* (2015.01)
  *H04L 1/00* (2006.01)

(58) Field of Classification Search
  CPC . H04W 88/02; H04W 64/006; H04W 72/542; H04W 24/06; H04W 4/027; H04W 4/025; H04W 4/023; G06N 5/04; G06N 20/00; G06N 3/0442; G06N 3/08; H04B 17/3913; H04B 17/17; H04B 17/373; H04B 17/327; H04B 7/061; H04B 17/309; H04B 17/27; H04L 1/0001; H04L 25/0254; H04L 41/147; H04L 41/145; H04L 67/34; H04L 41/16; H04L 67/52; H04L 1/20
  See application file for complete search history.

(56) References Cited

U.S. PATENT DOCUMENTS

| | | | | |
|---|---|---|---|---|
| 2013/0039270 | A1* | 2/2013 | Strinati | H04W 52/20 370/328 |
| 2018/0349788 | A1* | 12/2018 | Sarkar | G06N 20/00 |
| 2019/0251603 | A1* | 8/2019 | Jaatinen | G06N 20/00 |
| 2020/0097015 | A1* | 3/2020 | Keselman | G06N 3/08 |
| 2020/0235833 | A1* | 7/2020 | Zhu | H04B 17/373 |
| 2020/0304195 | A1* | 9/2020 | Wang | H04B 17/27 |
| 2021/0006989 | A1* | 1/2021 | Lee | H04W 24/06 |
| 2021/0194733 | A1* | 6/2021 | Huangfu | H04B 17/3913 |
| 2021/0204152 | A1* | 7/2021 | Vasudevan | H04L 41/147 |
| 2021/0351885 | A1* | 11/2021 | Chavva | H04B 17/373 |
| 2022/0366245 | A1* | 11/2022 | Guez | G06N 3/08 |
| 2022/0414466 | A1* | 12/2022 | Ding | G06N 20/20 |
| 2023/0068386 | A1* | 3/2023 | Akdeniz | G06N 3/08 |
| 2023/0198855 | A1* | 6/2023 | Ganesan | G06N 20/00 |
| 2023/0232361 | A1* | 7/2023 | Hirzallah | H04W 64/00 370/329 |
| 2023/0262520 | A1* | 8/2023 | Sarkar | H04B 7/06952 370/235 |
| 2024/0098307 | A1* | 3/2024 | Ma | H04W 24/06 |
| 2024/0163298 | A1* | 5/2024 | Wang | H04L 1/0001 |
| 2024/0354654 | A1* | 10/2024 | Ying | H04L 41/16 |
| 2024/0406166 | A1* | 12/2024 | Bell | G06N 3/045 |
| 2025/0287242 | A1* | 9/2025 | Soldati | H04W 24/02 |

FOREIGN PATENT DOCUMENTS

| | | | | |
|---|---|---|---|---|
| CN | 112153658 A | 12/2020 | | |
| CN | 112543471 A | 3/2021 | | |
| EP | 3576437 A1 * | 12/2019 | | H04W 4/027 |
| WO | WO-2024242612 A1 * | 11/2024 | | H04W 24/02 |

OTHER PUBLICATIONS

Partial International Search Report—PCT/US2022/073287—ISA/EPO—Oct. 25, 2022.

International Search Report and Written Opinion—PCT/US2022/073287—ISA/EPO—Jan. 24, 2023.

Yan Y., et al., "Feasibility of Multipath Construction in mmWave Backhaul", 2021 IEEE 22nd International Symposium on A World of Wireless, Mobile and Multimedia Networks (WOWMOM), IEEE, Jun. 7, 2021, XP033937632, pp. 81-90, abstract pp. 82-84.

Kim H., et al., "Relay Nodes Selection Using Reinforcement Learning", 2021 International Conference on Artificial Intelligence in Information and Communication (ICAIIC), Apr. 29, 2021, pp. 329-334.

* cited by examiner

300

350
Rear seat entertainment unit

320
Telematics control unit

360
Camera

330
Antenna module

370
Brought in device

340
Tethered phone

310
Head unit

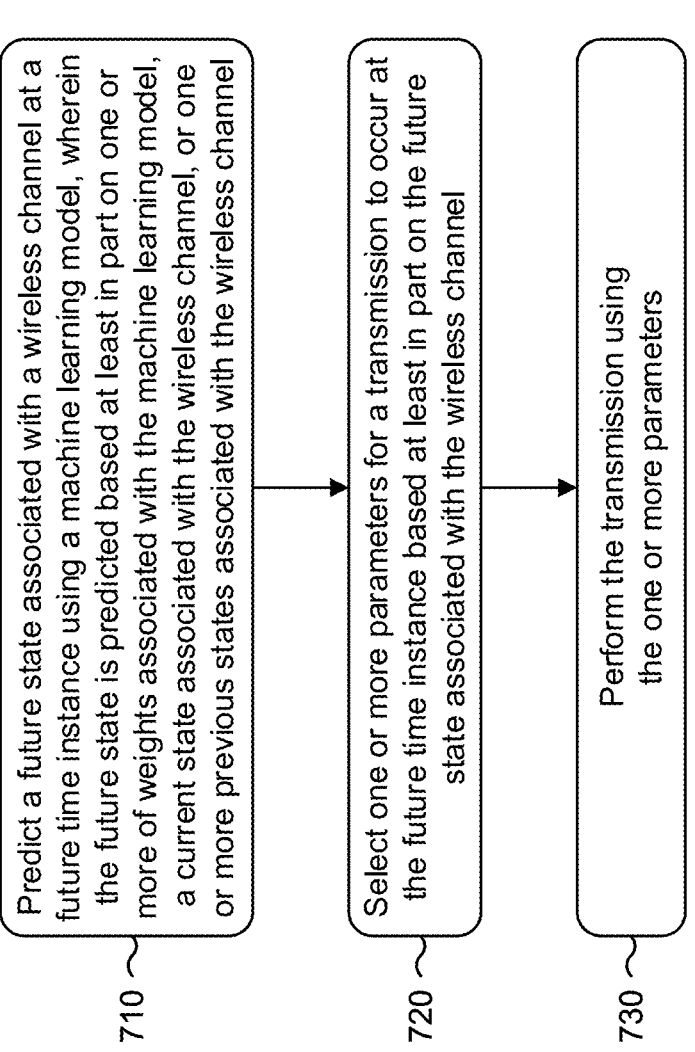

700

710 — Predict a future state associated with a wireless channel at a future time instance using a machine learning model, wherein the future state is predicted based at least in part on one or more of weights associated with the machine learning model, a current state associated with the wireless channel, or one or more previous states associated with the wireless channel 720 — Select one or more parameters for a transmission to occur at the future time instance based at least in part on the future state associated with the wireless channel 730 — Perform the transmission using the one or more parameters

FIG. 7

ADAPTIVE TRANSMISSION AND TRANSMISSION PATH SELECTION BASED ON PREDICTED CHANNEL STATE

FIELD OF THE DISCLOSURE

Aspects of the present disclosure generally relate to wireless communication and to techniques and apparatuses for adaptive transmission and transmission path selection based on a predicted channel state.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. NR, which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a transmitter node. The method may include predicting a future state associated with a wireless channel at a future time instance using a machine learning model, wherein the future state is predicted based at least in part on one or more of weights associated with the machine learning model, a current state associated with the wireless channel, or one or more previous states associated with the wireless channel. The method may include selecting one or more parameters for a transmission to occur at the future time instance based at least in part on the future state associated with the wireless channel. The method may include performing the transmission using the one or more parameters.

Some aspects described herein relate to a transmitter node for wireless communication. The transmitter node may include a memory and one or more processors coupled to the memory. The one or more processors may be configured to predict a future state associated with a wireless channel at a future time instance using a machine learning model, wherein the future state is predicted based at least in part on one or more of weights associated with the machine learning model, a current state associated with the wireless channel, or one or more previous states associated with the wireless channel. The one or more processors may be configured to select one or more parameters for a transmission to occur at the future time instance based at least in part on the future state associated with the wireless channel. The one or more processors may be configured to perform the transmission using the one or more parameters.

Some aspects described herein relate to a non-transitory computer-readable medium that stores a set of instructions for wireless communication by a transmitter node. The set of instructions, when executed by one or more processors of the transmitter node, may cause the transmitter node to predict a future state associated with a wireless channel at a future time instance using a machine learning model, wherein the future state is predicted based at least in part on one or more of weights associated with the machine learning model, a current state associated with the wireless channel, or one or more previous states associated with the wireless channel. The set of instructions, when executed by one or more processors of the transmitter node, may cause the transmitter node to select one or more parameters for a transmission to occur at the future time instance based at least in part on the future state associated with the wireless channel. The set of instructions, when executed by one or more processors of the transmitter node, may cause the transmitter node to perform the transmission using the one or more parameters.

Some aspects described herein relate to an apparatus for wireless communication. The apparatus may include means for predicting a future state associated with a wireless channel at a future time instance using a machine learning model, wherein the future state is predicted based at least in part on one or more of weights associated with the machine learning model, a current state associated with the wireless channel, or one or more previous states associated with the wireless channel. The apparatus may include means for selecting one or more parameters for a transmission to occur at the future time instance based at least in part on the future state associated with the wireless channel. The apparatus may include means for performing the transmission using the one or more parameters.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 7 is a diagram illustrating an example process associated with adaptive transmission and transmission path selection based on a predicted channel state, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
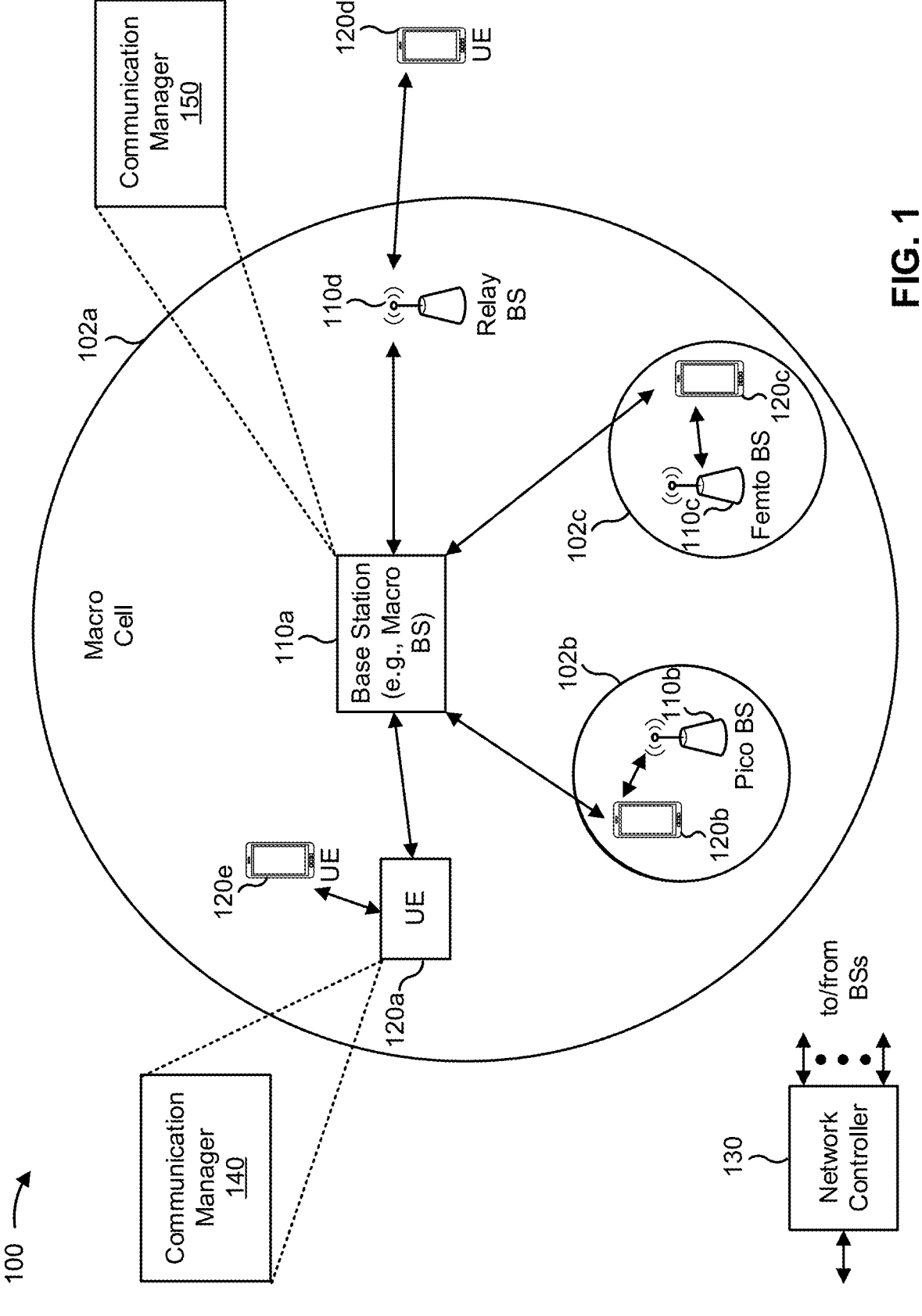
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a transmitter node may correspond to a UE 120, and the transmitter node may include a communication manager 140. Additionally, or alternatively, a transmitter node may correspond to a base station 110, and may include a communication manager 150. As described in more detail elsewhere herein, the communication manager 140 and/or the communication manager 150 may predict a future state associated with a wireless channel at a future time instance using a machine learning model, wherein the future state is predicted based at least in part on one or more of weights associated with the machine learning model, a current state associated with the wireless channel, or one or more previous states associated with the wireless channel; select one or more parameters for a transmission to occur at the future time instance based at least in part on the future state associated with the wireless channel; and perform the transmission using the one or more parameters. Additionally, or alternatively, the communication manager 140 and/or the communication manager 150 may perform one or more other operations described herein.

As indicated above, FIG. 1 is provided as an example. Other examples may differ from what is described with regard to FIG. 1.

Figure 2:
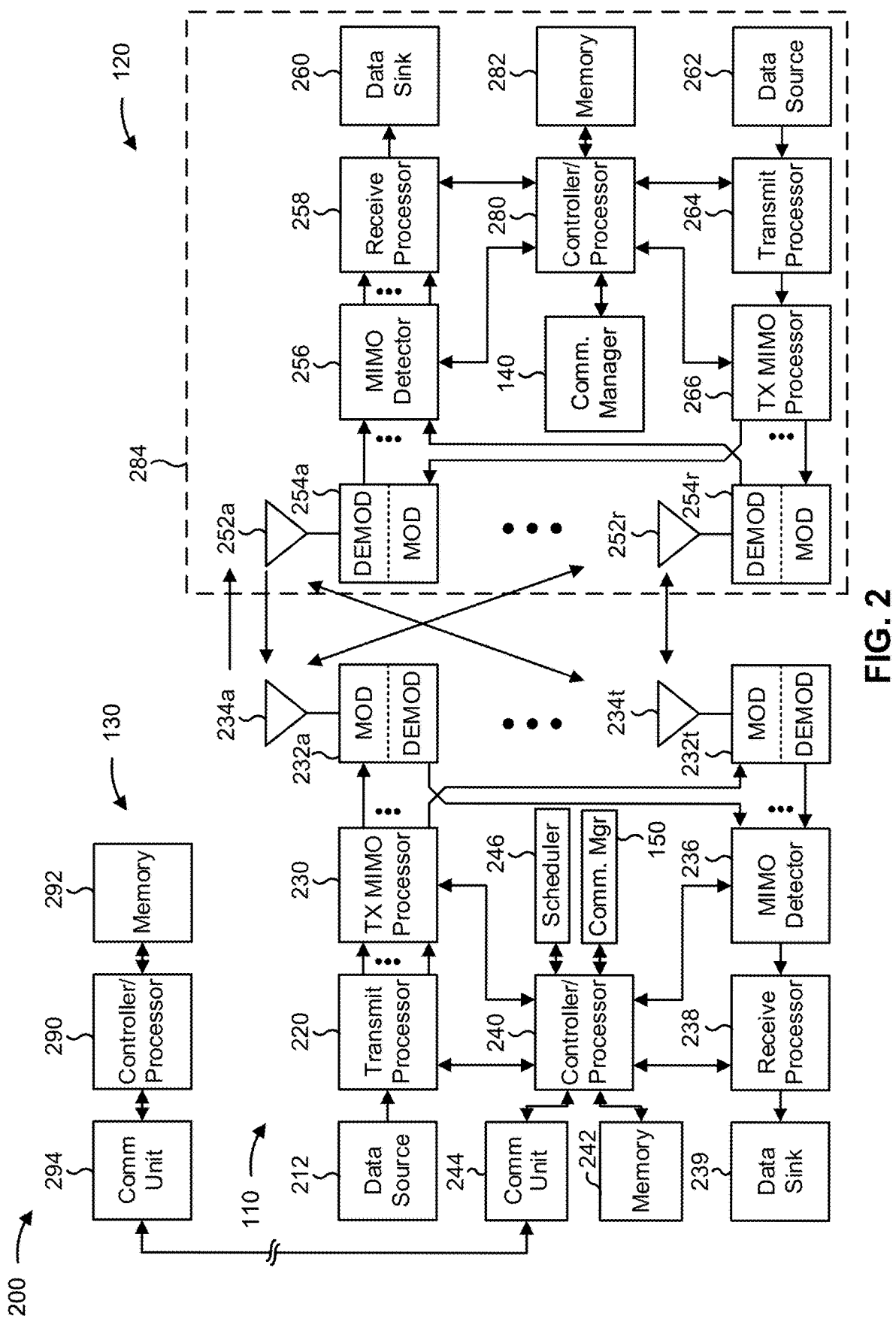
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The UE 120 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4-7).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem (s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4-7).

The controller/processor 240 of the base station 110, the controller/processor 280 of the UE 120, and/or any other component(s) of FIG. 2 may perform one or more techniques associated with adaptive transmission and transmission path selection based on a predicted channel state, as described in more detail elsewhere herein. In some aspects, a transmitter node as described herein is the base station 110, is included in the base station 110, or includes one or more components of the base station 110 shown in FIG. 2. Additionally, or alternatively, a transmitter node as described herein is the UE 120, is included in the UE 120, or includes one or more components of the UE 120 shown in FIG. 2. For example, the controller/processor 240 of the base station 110, the controller/processor 280 of the UE 120, and/or any other component(s) of FIG. 2 may perform or direct operations of, for example, process 700 of FIG. 7 and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 700 of FIG. 7 and/or other processes as described herein. In some examples, executing instructions may include running the instructions, converting the instructions, compiling the instructions, and/or interpreting the instructions, among other examples.

In some aspects, a transmitter node includes means for predicting a future state associated with a wireless channel at a future time instance using a machine learning model, wherein the future state is predicted based at least in part on one or more of weights associated with the machine learning model, a current state associated with the wireless channel, or one or more previous states associated with the wireless channel; means for selecting one or more parameters for a transmission to occur at the future time instance based at least in part on the future state associated with the wireless channel; and/or means for performing the transmission using the one or more parameters. In some aspects, the means for the transmitter node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246. Additionally, or alternatively, in some aspects, the means for the transmitter node to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
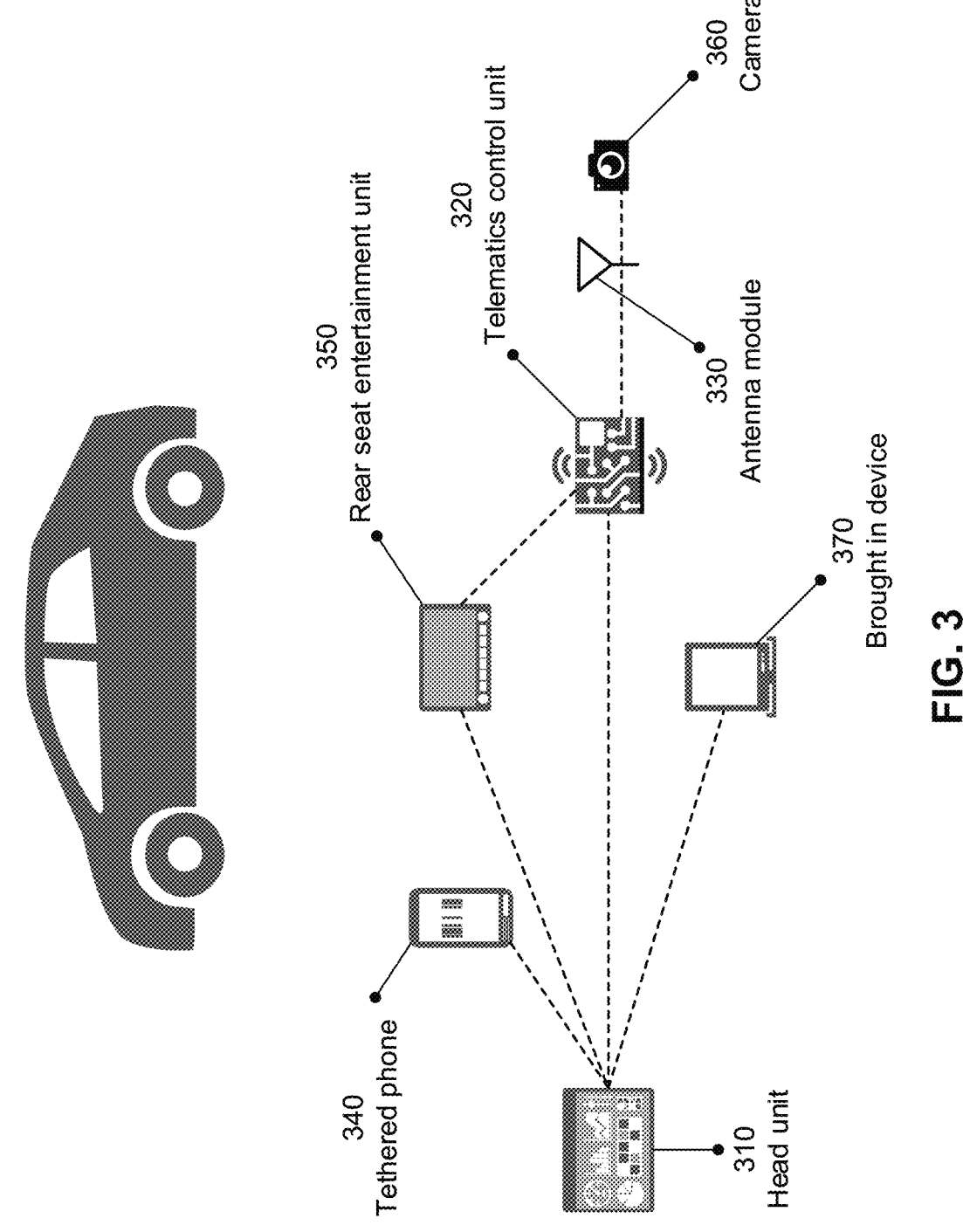
FIG. 3 is a diagram illustrating an example of a semi-static wireless environment, in accordance with the present disclosure.

FIG. 3 is a diagram illustrating an example 300 of a semi-static wireless environment, in accordance with the present disclosure.

In a wireless network, a signal is generally transmitted from a transmitter node to a receiver node over a wireless channel. While the signal is traveling over the wireless channel, the signal may be distorted and/or noise may be added to the signal due to various factors. For example, the signal may be subject to attenuation, phase shift, scattering, power decay, large scale fading, small scale fading, interference experienced by the transmitter node, interference experienced by the receiver node, and/or capabilities of the transmitter node and/or the receiver node (e.g., multi-antenna capabilities and/or maximum transmission power), among other examples. Accordingly, in order to adapt transmission parameters and/or reception parameters to ensure that the signal can be received and properly decoded by the receiver node, the transmitter node and/or the receiver node may perform channel estimation to learn characteristics associated with the wireless channel between the transmitter node and the receiver node and correct for any distortion or noise in the wireless channel.

For example, before each transmission and/or at periodic intervals, the wireless channel between the transmitter node and the receiver node may be learned based on pilot or reference signals that are transmitted over the wireless channel. For example, in order to estimate a downlink channel from a base station to a UE, the base station may transmit a channel state information reference signal (CSI-RS) or another suitable pilot or reference signal to the UE. The UE may then measure or otherwise estimate the downlink channel using the CSI-RS (e.g., based on a correlation between properties associated with the transmitted CSI-RS and properties associated with the received CSI-RS), use the estimated downlink channel to demodulate a downlink signal, and transmit channel state feedback based on the estimated downlink channel to the base station (e.g., in a CSI report). The base station may then use the channel state feedback to adapt one or more transmission parameters for a downlink transmission to occur in a next time instance (e.g., the base station may adapt a modulation order, code rate, precoder, transmission power, and/or other suitable parameters based on a quality or strength of the downlink channel). Furthermore, for an uplink channel, the UE may transmit a sounding reference signal (SRS) to enable the base station to perform uplink channel estimation and demodulate an uplink transmission in a similar manner.

In general, the state associated with a wireless channel (e.g., the characteristics or properties of a wireless channel that are learned from measuring a reference signal) tends to be highly dynamic, as channel estimation may depend on factors such as device mobility affecting the number and/or relative positions of devices within a wireless environment, physical properties of the wireless environment surrounding the transmitter node and the receiver node (e.g., objects that may reflect, scatter, and/or block wireless signals), and/or other factors. Accordingly, in a wireless environment where the presence and/or movement of devices and/or objects dynamically vary, the channel estimate used to adapt transmission parameters and/or improve demodulation performance is neither static nor predictable from one time instance to the next. The transmitter node and the receiver node therefore need to frequently perform channel estimation and/or provide channel state feedback based on reference signal transmissions (e.g., at every time instance, before every transmission, and/or at periodic intervals), which can introduce significant overhead in a wireless network (e.g., requiring frequent reference signal transmissions, measurements, and/or transmission of channel state feedback). Furthermore, channel estimation tends to be a reactive mechanism, where transmission and/or reception parameters are adapted based on current or recent conditions associated with a wireless channel that could potentially no longer exist at the time that a transmission is actually performed.

Accordingly, some aspects described herein relate to adaptive transmission and transmission path selection based on a predicted channel state. For example, in some aspects, a transmitter node may obtain a machine learning model (e.g., a long short-term memory (LSTM), a gated recurrent unit (GRU), or a recurrent neural network (RNN), among other examples) that can be used to predict a future state associated with a wireless channel at a future time instance. A future time instance can include one or more time instants and/or one or more time periods. The transmitter node may then select one or more transmission parameters for a transmission to occur at the future time instance and/or one or more transmission paths over which to send the transmission based on the predicted state of the wireless channel at the future time instance. For example, at a current time instance, the transmitter node may infer or otherwise predict the state of the wireless channel at a future time instance based on weights associated with the machine learning model, a current state associated with the wireless channel, and one or more previous states associated with the wireless channel. In this way, the transmitter node may proactively adapt transmissions based on the channel state that is predicted to occur at the future time instance and/or select the optimal transmission path(s) to a destination node to receive the transmission, which may reduce signaling overhead and/or delays associated with channel estimation that is dependent on reference signal transmissions. Furthermore, in some aspects, adaptive transmission and transmission path selection based on a predicted channel state may be particularly well-suited to wireless environments where channel conditions are semi-static and/or applications that have ultra-low latency requirements that cannot be satisfied when there is a need to perform channel estimation based on reference signal transmissions.

For example, FIG. 3 illustrates an in-vehicle wireless environment in which a wireless channel may have a semi-static configuration based on various devices having fixed positions and/or predictable motion patterns. For example, as shown in FIG. 3, the in-vehicle wireless environment may include a head unit 310, a telematics control unit (TCU) 320, an antenna module 330, a tethered phone 340 that may provide screen mirroring via the head unit 310 and/or telephony functions via the head unit 310 or the TCU 320, a rear seat entertainment unit 350 to stream content, a camera 360 that can capture images of the environment around the vehicle, a brought-in device 370 that may connect to a wireless local area network (WLAN) hotspot provided by the head unit 310, the TCU 320, and/or the antenna module 330, and/or other devices (e.g., sensors that may monitor a state of the vehicle and/or the environment around the vehicle and/or actuators that may control one or more systems in the vehicle). In general, the devices that transmit and receive wireless signals in the in-vehicle wireless environment may have fixed and/or relatively stationary positions, whereby the wireless channels experienced by the transmitting and receiving devices tends to be semi-static. Furthermore, in some wireless environments (e.g., an industrial IoT (IIoT) environment), devices and/or objects in the wireless environment may have highly predictable motion patterns (e.g., a robot arm that moves to pick up an object at a first location and put down the object in a different location). Accordingly, in some aspects, model-based channel prediction may be used in semi-static wireless environments, where devices can learn the characteristics of the wireless channel and predict the state of the wireless channel for future time instances with a high level of accuracy because the number, relative positions, and/or motion patterns of devices is fixed or predictable.

Furthermore, as described herein, model-based channel prediction may provide proactive mechanisms to adapt transmission parameter, whereas existing channel estimation techniques tend to be reactive based on reference signal transmissions. In this way, the model-based channel prediction may improve performance for applications that require ultra-reliable low-latency communications (URLLC). For example, in an in-vehicle wireless environment, internal mechanisms that involve wireless communication between in-vehicle systems (e.g., brake transmission control, engine transmissions, intra-sensor communications) may have a URLLC requirement. Furthermore, URLLC requirements may be applicable in IIoT environments that involve highly precise and coordinated movements among devices. In these (and other) applications that have a URLCC requirement, reactive channel estimation techniques based on reference signal transmissions, where channel estimation and/or feedback is needed for every transmissions, are not optimal or practical due to the delays that are incurred using reactive channel estimation techniques. Accordingly, in some aspects, the model-based channel prediction techniques described herein may ensure that packets are deterministically delivered when transmitted the first time (e.g., minimizing reliance on retransmissions based on negative acknowledgement (NACK) feedback) while maximizing spectral efficiency. Additionally, or alternatively, in cases where there are multiple possible paths from a transmitter node to a destination node (e.g., there are one or more intermediate nodes that can be used to relay a transmission from the transmitter node to the destination node via one or more hops), the model-based channel prediction techniques described herein may enable the transmitter node to select one or more paths over other possible paths based on the predicted channel state that is likely to occur in each link.

As indicated above, FIG. 3 is provided as an example. Other examples may differ from what is described with regard to FIG. 3.

Figure 4:
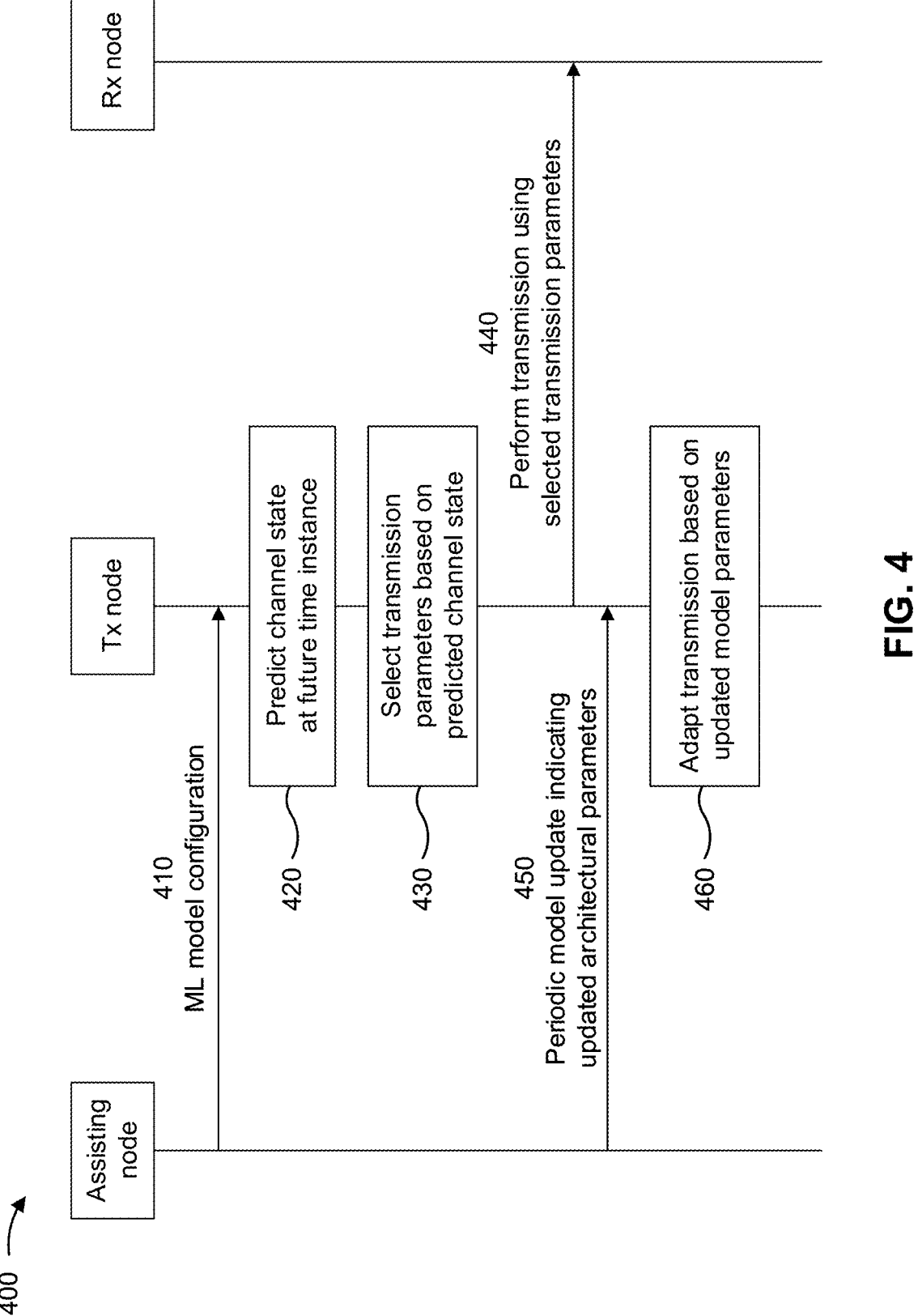
FIGS. 4-5 are diagrams illustrating examples associated with adaptive transmission based on a predicted channel state, in accordance with the present disclosure.

FIG. 4 is a diagram illustrating an example 400 associated with adaptive transmission based on a predicted channel state, in accordance with the present disclosure. As shown in FIG. 4, example 400 includes communication between a transmitter node (shown as Tx node), a receiver node (shown as Rx node), and an assisting node. In some aspects, the transmitter node may correspond to a base station that transmits a wireless signal on a downlink channel, and the receiver node may correspond to a UE that receives the wireless signal on the downlink channel. In other examples, the transmitter node and the receiver node may correspond to a UE and a base station communicating on an uplink channel or two UEs communicating on a sidelink channel. Furthermore, in some aspects, the assisting node may generally correspond to a control node, a scheduling node, or another suitable node (e.g., a base station, a roadside unit (RSU), or a UE) that may coordinate or assist with coordinating communications between the transmitter node and the receiver node.

As shown in FIG. 4, and by reference number 410, the assisting node may transmit, and the transmitter node may receive, information that configures a machine learning model or another suitable machine learning model that can be used to predict the future state associated with a wireless channel at a future time instance. For example, in some aspects, the machine learning model may be an LSTM model in which each neuron or LSTM unit includes a cell that remembers values over arbitrary time intervals in addition to an input gate, an output gate, and a forget gate that regulate information flow into and out of the cell. In another example, the machine learning model may be a GRU, which is generally similar to an LSTM model except that a GRU does not have an output gate, which may improve performance on smaller and/or less frequent datasets. In another example, the machine learning model may be an RNN, which is an artificial neural network in which connections between nodes form a directed graph along a temporal sequence. However, it will be appreciated that LSTMs, GRUs, and RNNs are examples, and that other suitable machine learning models that can be used to predict the future state of a wireless channel may be used.

In some aspects, the assisting node may provide the machine learning model to the transmitter node, or the assisting node may provide information to the transmitter node to otherwise enable the transmitter node to obtain the machine learning model (e.g., the assisting node may provide a model identifier that the transmitter node uses to obtain the machine learning model from internal storage or a network storage location). Furthermore, as described herein, the assisting node may indicate one or more architectural parameters for the machine learning model. For example, in some aspects, the architectural parameters may include a number of layers associated with the machine learning model, activation functions used in different layers, weights associated with the different layers, drop-out parameters, architectural connection parameters for one or more gates (e.g., cell gates and/or forget gates), and/or inputs to an inference algorithm, among other examples.

As further shown in FIG. 4, and by reference number 420, the transmitter node may use the machine learning model to predict a future state associated with a wireless channel at a future time instance. For example, in some aspects, the transmitter node may determine one or more inputs to an inference algorithm that are based on a current state associated with the wireless channel and/or one or more previous states associated with the wireless channel, and the transmitter node may provide the one or more inputs to the machine learning model to predict the future state of the wireless channel based on the weights associated with the machine learning model, the current state associated with the wireless channel, and/or the one or more previous states associated with the wireless channel (e.g., the state of the wireless channel over the last T time instances). For example, at a current time n, the one or more inputs that relate to the current state or the previous state(s) of the wireless channel may include one or more measurements (e.g., an RSSI or RSRP) associated with received signals, a number of sensed devices in a vicinity of the transmitter node (e.g., a number of sensed UEs based on decoded sidelink control information (SCI)), a number of sensed devices in the vicinity of the transmitter node that are moving at a speed that satisfies (e.g., is greater than or equal to) a threshold, and/or a geographical area that indicates where the transmitter node is located (e.g., based on a zone identifier or a circular region with a preconfigured radius with the transmitter node at the center of the circular region), among other examples. Accordingly, at a current time n, the transmitter node may provide the one or more inputs to the machine learning model for the current time instance and the last T time instances, which may encompass time instances $\{n-T, n-T-1, \ldots n\}$.

As further shown in FIG. 4, and by reference number 430, the transmitter node may select one or more transmission parameters for a transmission to occur at a future time instance based on the predicted state of the wireless channel at the future time instance. For example, when predicting the future state of the wireless channel at the current time n, the transmitter node may use the one or more inputs over time instances $\{n-T, n-T-1, \ldots n\}$ together with the weights at the ith layer, $\{W_i, b_i\}$, along with an activation function of the ith layer, $\{\sigma_i\}$, to obtain an output Y, where Y is the predicted state of the wireless channel at the future time instance. For example, in a two-layer model, an output that indicates the predicted state of the wireless channel at a future time instance may be given by $Y=\sigma_2(W_2Y_1+b_2)$, where $Y_1=\sigma_1(W_1X_1+b_1)$. Accordingly, in some aspects, the transmitter node may obtain the output that indicates the predicted state of the wireless channel at a future time instance, and may calculate $\tilde{Y}=f(Y)$ (e.g., $f(Y)=|Y|)$), where $\tilde{Y}$ is mapped to or otherwise indicates the transmission parameters to be used for the transmission to occur at the future time instance. For example, in some aspects, the transmitter node may determine that a packet is to be proactively retransmitted (without relying on NACK feedback) a number of times based on $\tilde{Y}$ failing to satisfy a threshold or may perform only a single transmission of the packet based on $\tilde{Y}$ satisfying the threshold. In other examples, the transmitter node may select a first modulation order, code rate, or MCS based on $\tilde{Y}$ having a value in a first range or may select a second modulation order, code rate, or MCS based on $\tilde{Y}$ having a value in a second range. In still other examples, the transmitter node may perform a single packet transmission using m transmit antennas, using an Alamouti/rotation coding scheme, and/or using a particular precoder to orient a direction of the transmission based on the value of $\tilde{Y}$.

As further shown in FIG. 4, and by reference number 440, the transmitter node may then perform the transmission at the future time instance using the one or more transmission parameters. For example, as described above, the transmitter node may perform a single transmission, may perform a number of blind retransmissions (without feedback), may perform the transmission using a modulation order and/or code rate, may perform the transmission using a number of transmit antennas and/or a coding scheme, and/or may perform the transmission using a certain precoder depending on the value of $\tilde{Y}$, which is generally determined as a function of the output from the machine learning model.

As further shown in FIG. 4, and by reference number 450, the assisting node may transmit, and the transmitter node may receive, a periodic model update that indicates one or more updated architectural parameters for the machine learning model. For example, in some aspects, the one or more updated architectural parameters may include an update to the number of layers associated with the machine learning model, an update to the activation function(s) used in different layers, an update to the weights associated with different layers, an update to one or more drop out parameters, an update to architectural connection parameters for one or more cell gates or forget gates, and/or an update to the inputs to the inference algorithm, among other examples. Accordingly, as further shown in FIG. 4, and by reference number 460, the transmitter node may then predict the future state of the wireless channel for one or more future time instances and adapt transmission parameters for future transmissions based on the periodically updated architectural parameters.

As indicated above, FIG. 4 is provided as an example. Other examples may differ from what is described with regard to FIG. 4.

Figure 5:
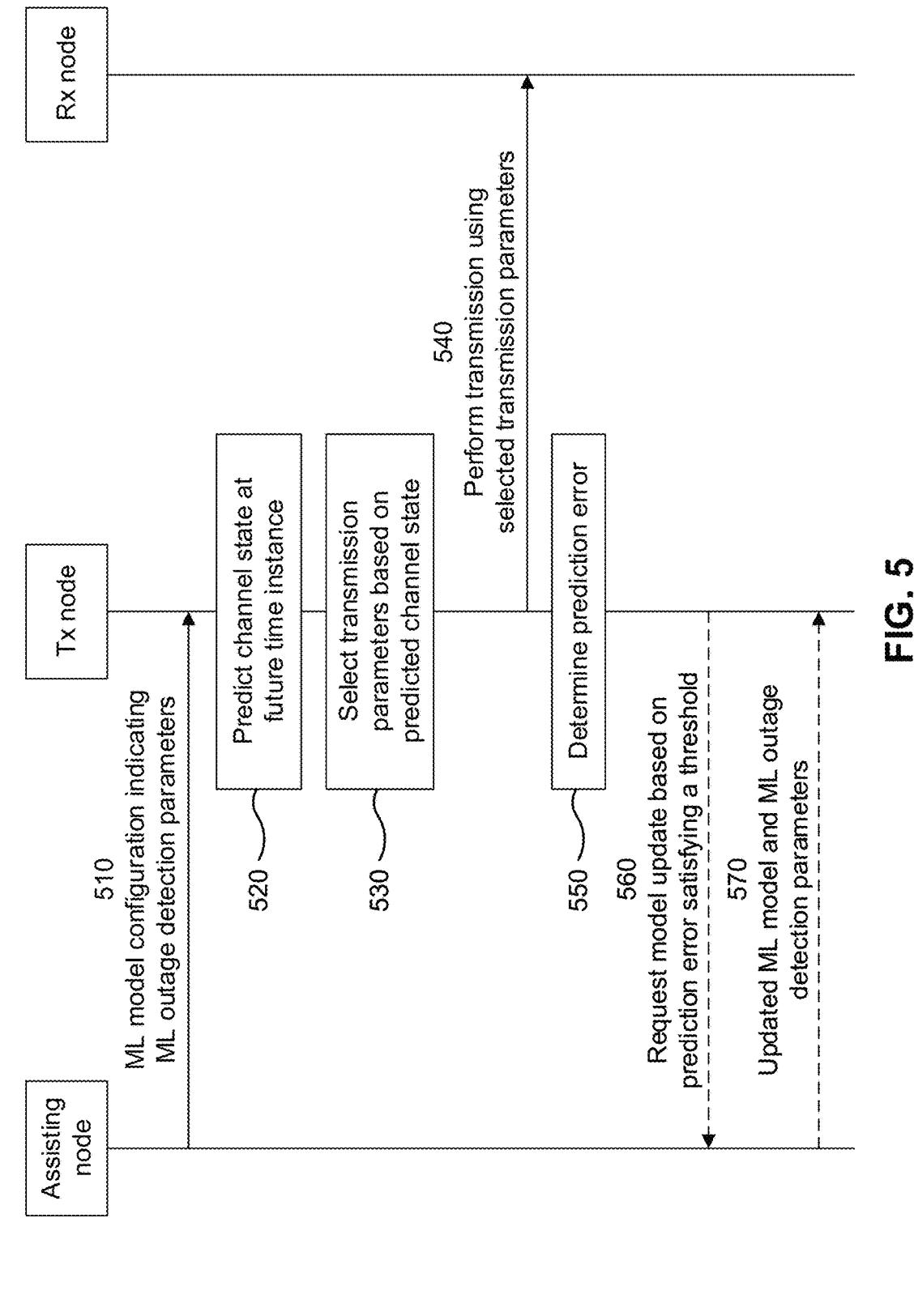

FIG. 5 is a diagram illustrating an example 500 associated with adaptive transmission based on a predicted channel state, in accordance with the present disclosure. As shown in FIG. 5, example 500 includes communication between a transmitter node (shown as Tx node), a receiver node (shown as Rx node), and an assisting node. In some aspects, the transmitter node may correspond to a base station that transmits a wireless signal on a downlink channel, and the receiver node may correspond to a UE that receives the wireless signal on the downlink channel. In other examples, the transmitter node and the receiver node may correspond to a UE and a base station communicating on an uplink channel or two UEs communicating on a sidelink channel. Furthermore, in some aspects, the assisting node may generally correspond to a control node, a scheduling node, or another suitable node (e.g., a base station, RSU, or UE) that may coordinate or assist with coordinating communications between the transmitter node and the receiver node.

As shown in FIG. 5, and by reference number 510, the assisting node may transmit, and the transmitter node may receive, information that configures a machine learning model or another suitable machine learning model that can be used to predict the future state associated with a wireless channel at a future time instance. For example, in some aspects, the machine learning model may be an LSTM model, a GRU, an RNN, or another suitable machine learning model that can be used to predict the future state of a wireless channel. In some aspects, the assisting node may provide the machine learning model to the transmitter node, or the assisting node may provide information to the transmitter node to otherwise enable the transmitter node to obtain the machine learning model (e.g., the assisting node may provide a model identifier that the transmitter node uses to obtain the machine learning model from internal storage or a network storage location).

Furthermore, in addition to indicating one or more architectural parameters for the machine learning model (e.g., as described above with reference to FIG. 4), the assisting node may indicate one or more outage detection parameters for detecting a machine learning outage event. For example, the outage detection parameters may include an accuracy requirement in a channel prediction (c) over a time period S, a number of times that a packet transmission resulted in incorrect hybrid automatic repeat request (HARQ) feedback (e.g., a NACK when actual feedback should have been an ACK and/or an ACK when actual feedback should have been a NACK), and/or other parameters that may indicate that the machine learning model yielded an output that did not accurately predict the future state of the wireless channel. In this way, as described herein, the transmitter node may request an update to the machine learning model in an on-demand manner when a machine learning outage event is detected.

As further shown in FIG. 5, and by reference number 520, the transmitter node may use the machine learning model to predict a future state associated with a wireless channel at a future time instance. For example, in some aspects, the transmitter node may determine one or more inputs to an inference algorithm that are based on a current state associated with the wireless channel and/or one or more previous states associated with the wireless channel, and the transmitter node may provide the one or more inputs to the machine learning model to predict the future state of the wireless channel based on the weights associated with the machine learning model, the current state associated with the wireless channel, and/or the one or more previous states associated with the wireless channel (e.g., the state of the wireless channel over the last T time instances). For example, at a current time n, the one or more inputs that relate to the current state or the previous state(s) of the wireless channel may include one or more measurements (e.g., an RSSI or RSRP) associated with received signals, a number of sensed devices in a vicinity of the transmitter node (e.g., a number of sensed UEs based on decoded SCI), a number of sensed devices in the vicinity of the transmitter node that are moving at a speed that satisfies (e.g., is greater than or equal to) a threshold, and/or a geographical area that indicates where the transmitter node is located (e.g., based on a zone identifier or a circular region with a preconfigured radius with the transmitter node at the center of the circular region), among other examples. Accordingly, at a current time n, the transmitter node may provide the one or more inputs to the machine learning model for the current time instance and the last T time instances, which may encompass time instances $\{n{-}T, n{-}T{-}1, \ldots n\}$.

As further shown in FIG. 5, and by reference number 530, the transmitter node may select one or more transmission parameters for a transmission to occur at a future time instance based on the predicted state of the wireless channel at the future time instance. For example, when predicting the future state of the wireless channel at the current time n, the transmitter node may use the one or more inputs over time instances $\{n{-}T, n{-}T{-}1, \ldots n\}$ together with the weights at the ith layer, $\{W_i, b_i\}$, along with an activation function of the ith layer, $\{\sigma_i\}$, to obtain an output Y, where Y is the predicted state of the wireless channel at the future time instance. For example, in a two-layer model, an output that indicates the predicted state of the wireless channel at a future time instance may be given by $Y=\sigma_2(W_2Y_1+b_2)$, where $Y_1=\sigma_1(W_1X_1+b_1)$. Accordingly, in some aspects, the transmitter node may obtain the output that indicates the predicted state of the wireless channel at a future time instance, and may calculate $\tilde{Y}=f(Y)$ (e.g., $f(Y)=|Y|$)), where $\tilde{Y}$ is mapped to or otherwise indicates the transmission parameters to be used for the transmission to occur at the future time instance. For example, in some aspects, the transmitter node may determine that a packet is to be proactively retransmitted (without relying on NACK feedback) a number of times based on $\tilde{Y}$ failing to satisfy a threshold or may perform only a single transmission of the packet based on $\tilde{Y}$ satisfying the threshold. In other examples, the transmitter node may select a first modulation order, code rate, or MCS based on $\tilde{Y}$ having a value in a first range or may select a second modulation order, code rate, or MCS based on $\tilde{Y}$ having a value in a second range. In still other examples, the transmitter node may perform a single packet transmission using m transmit antennas, using an Alamouti/rotation coding scheme, and/or using a particular precoder to orient a direction of the transmission based on the value of $\tilde{Y}$.

As further shown in FIG. 5, and by reference number 540, the transmitter node may perform the transmission at the future time instance using the one or more transmission parameters. For example, as described above, the transmitter node may perform a single transmission, may perform a number of blind retransmissions (without feedback), may perform the transmission using a modulation order and/or code rate, may perform the transmission using a number of transmit antennas and/or a coding scheme, and/or may perform the transmission using a certain precoder depending on the value of $\tilde{Y}$, which is generally determined as a function of the output from the machine learning model.

As further shown in FIG. 5, and by reference number 550, the transmitter node may determine a prediction error associated with the machine learning model. For example, the transmitter node may perform one or more measurements to determine an actual channel state at the time that the transmission is performed, $\hat{Y}$, and may compare the actual channel state to the predicted channel state, Y, that was output by the machine learning model. Accordingly, the transmitter node may determine whether a mean prediction error over the configured time period S satisfies the accuracy requirement, E. Additionally, or alternatively, the transmitter node may determine a number of packet transmissions that resulted in incorrect HARQ feedback (e.g., a NACK when actual feedback should have been an ACK and/or an ACK when actual feedback should have been a NACK) and/or any other metrics that may be relevant to detecting a machine learning outage event.

As further shown in FIG. 5, and by reference number 560, the transmitter node may transmit, to the assisting node, a request to update the machine learning model based on detection of the machine learning outage event. For example, in some aspects, the transmitter node may transmit the request to update the machine learning model based on the mean prediction error exceeding the accuracy requirement (e.g., based on determining that $|Y-\hat{Y}|{>}\varepsilon$). Additionally, or alternatively, the transmitter node may transmit the request to update the machine learning model based on the number of packet transmissions resulting in incorrect HARQ feedback satisfying a threshold and/or based on determining that one or more other conditions are satisfied. As shown by reference number 570, the assisting node may then update the architectural parameters and/or machine learning outage detection parameters based on the request, and the transmitter node may use the updated architectural parameters to predict the future state of the wireless channel for future time instances. In this way, relative to providing periodic model updates, the assisting node may provide a more accurate model update when requested based on the machine learning outage event because the assisting node may train and/or refine the machine learning model with more data obtained from other nodes (e.g., according to a federated learning algorithm). Additionally, or alternatively, in cases where the machine learning model is accurately predicting the future state of the wireless channel, limiting model updates to instances where a machine learning outage event is detected may avoid overhead associated with transmitting periodic model updates.

As indicated above, FIG. 5 is provided as an example. Other examples may differ from what is described with regard to FIG. 5.

Figure 6:
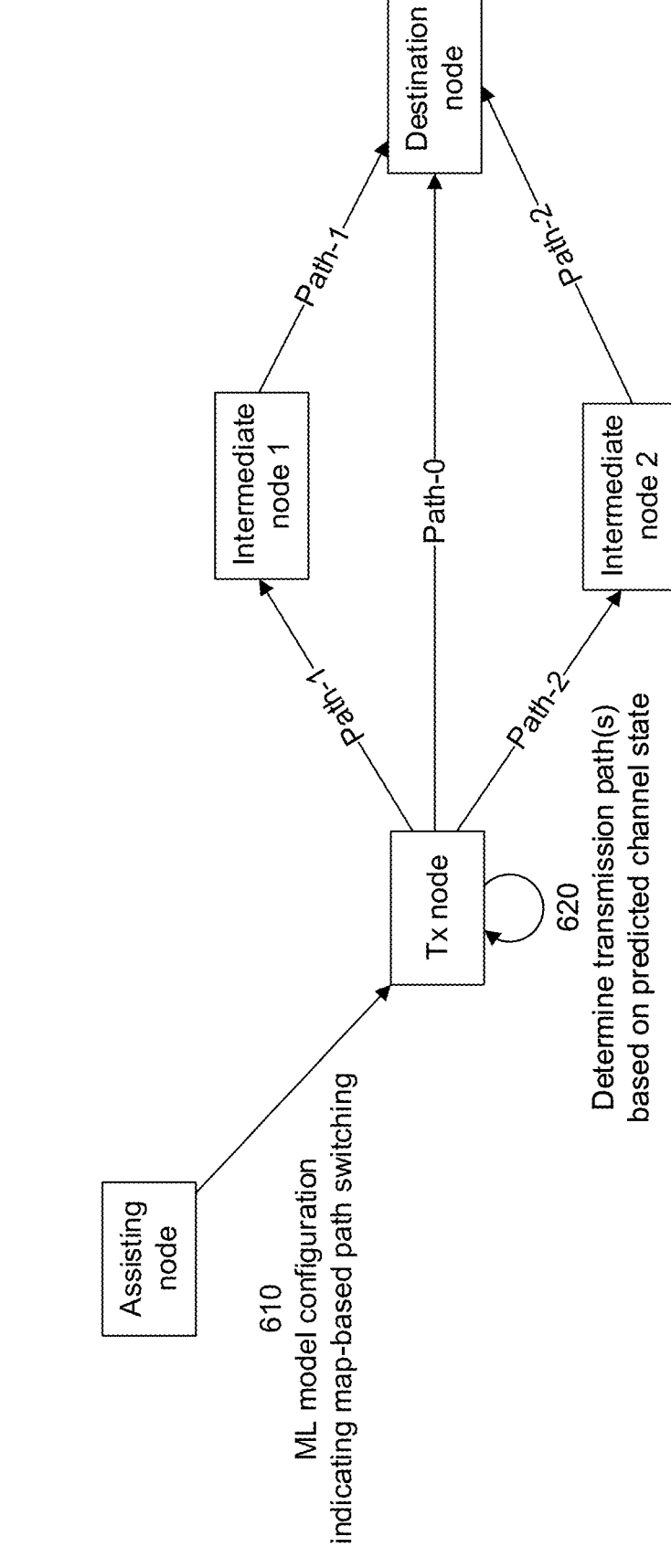
FIG. 6 is a diagram illustrating an example associated with transmission path selection based on a predicted channel state, in accordance with the present disclosure.

FIG. 6 is a diagram illustrating an example associated with transmission path selection based on a predicted channel state, in accordance with the present disclosure. As shown in FIG. 6, example 600 includes communication between a transmitter node (shown as Tx node), a destination node, one or more intermediate nodes, and an assisting node. In some aspects, the transmitter node may correspond to a base station that transmits a wireless signal on a downlink channel, the destination node may correspond to a UE that receives the wireless signal on the downlink channel, and the intermediate node(s) may correspond to one or more relay base stations or relay UEs that can forward a transmission from the base station to the UE via one or more hops. In other examples, the transmitter node and the destination node may correspond to a UE and a base station communicating on an uplink channel or two UEs communicating on a sidelink channel, and the intermediate node(s) may correspond to one or more relay base stations or relay UEs that can forward a transmission from the UE to the base station via one or more hops. Furthermore, in some aspects, the assisting node may generally correspond to a control node, a scheduling node, or another suitable node (e.g., a base station, RSU, and/or UE) that may coordinate or assist with coordinating communications between the transmitter, destination, and intermediate nodes.

As shown in FIG. 6, and by reference number 610, the assisting node may transmit, and the transmitter node may receive, information that configures a machine learning model or another suitable machine learning model that can be used to predict the future state associated with a wireless channel at a future time instance. For example, in some aspects, the machine learning model may be an LSTM model, a GRU, an RNN, or another suitable machine learning model that can be used to predict the future state of a wireless channel. In some aspects, the assisting node may provide the machine learning model to the transmitter node, or the assisting node may provide information to the transmitter node to otherwise enable the transmitter node to obtain the machine learning model (e.g., the assisting node may provide a model identifier that the transmitter node uses to obtain the machine learning model from internal storage or a network storage location).

Furthermore, in addition to indicating one or more architectural parameters and/or one or more outage detection parameters for detecting a machine learning outage event (e.g., as described above with reference to FIG. 4 and/or FIG. 5), the assisting node may indicate one or more parameters to configure map-based path switching for a transmission to be received at a destination node. For example, as shown in FIG. 6, there may be multiple possible transmission paths from the transmitter node to the destination node, and the parameters to configure map-based path switching may indicate which path or paths the transmitter node is to use to perform a transmission based on the predicted channel state for each wireless link. For example, in FIG. 6, the multiple transmission paths include a direct path from the transmitter node to the destination node (shown as Path-0), a first indirect path that traverses a first intermediate node (shown as Path-1), and a second indirect path that traverses a second intermediate node (shown as Path-2). It will be appreciated, however, that the different transmission paths shown in FIG. 6 are for simplicity, and that in practice there may be many different possible paths from the transmitter node to the destination node depending on a topology of the transmitter node, the destination node, and any intermediate nodes in the vicinity of the transmitter node or the destination node.

As further shown in FIG. 6, and by reference number 620, the transmitter node may determine one or more transmission paths to use to perform a transmission to be received at the destination node based on predicted channel states for each possible transmission path. For example, in some aspects, the transmitter node may use the machine learning model and the weights associated with the different layers of the machine learning model to predict the future state associated with the wireless channel between the transmitter node and the destination node and the future state associated with the wireless channel between the transmitter node and each intermediate node. In general, as described herein, the map information that indicates the multiple possible transmission paths and the predicted channel states may be based on relative locations of the transmitter node, the destination node, and any intermediate nodes in the vicinity of the transmitter node and the destination node. For example, the map information may include a direct path between the transmitter node and the destination node based on the destination node being within a transmission range of the transmitter node, and an intermediate node may be included in the map information based on the intermediate node being within a transmission range of the transmitter node, the destination node, or another intermediate node. Accordingly, the map information may generally indicate one or more viable paths that a packet can travel from the transmitter node to the destination node, and the transmitter node may predict the future state associated with each potentially viable path to determine which path or paths to use.

For example, in some aspects, the transmitter node may use the machine learning model to predict the channel state, V, for each potentially viable transmission path toward the destination node at a future time instance in a similar manner as described above with reference to FIG. 4 and/or FIG. 5. In this case, the transmitter node may select, among the multiple potential transmission paths toward the destination node, one or more transmission paths to use for the transmission based on the predicted channel states. For example, if the predicted channel state, V, has a value that fails to satisfy a threshold, the transmitter node may transmit a packet to the destination node via the direct path and to one or more intermediate nodes using a groupcast communication technique. More generally, the transmitter node may use more than one transmission path (e.g., the direct path and one or more indirect paths, or multiple indirect paths) to create diversity because the value of the predicted channel state indicates poor channel conditions. Accordingly, in some aspects, the value of the predicted channel state may be used to determine a diversity order, which may indicate a number of transmission paths over which the transmitter node performs a groupcast to increase path diversity (e.g., a diversity order of two (2) may indicate that two (2) alternate paths are to be used for the groupcast transmission of the packet). In other examples, the transmitter node may transmit the packet to one or more intermediate nodes that are within a threshold distance based on the predicted channel state having a value in a certain range, and the intermediate node(s) may forward the packet to the destination node via one or more hops, or the transmitter node may transmit the packet to the destination node over the direct path only based on the predicted channel state having a value that satisfies a threshold indicating strong channel conditions.

In this way, the transmitter node may select the best transmission path(s) to increase a probability that the packet will successfully arrive at the destination node based on the predicted channel conditions and the availability of one or more intermediate nodes that can relay the packet to the destination node. Furthermore, whenever the assisting node senses a change to the map information (e.g., because a new device comes within communication range of the transmitter node or the destination node or ceases to be within communication range of the transmitter node or the destination node), the assisting node may provide an updated machine learning model with updated map information to the transmitter node. Additionally, or alternatively, the transmitter node may request the updated machine learning model with the updated map information from the assisting node upon sensing a change to the map.

As indicated above, FIG. 6 is provided as an example. Other examples may differ from what is described with regard to FIG. 6.

FIG. 7 is a diagram illustrating an example process 700 performed, for example, by a transmitter node, in accordance with the present disclosure. Example process 700 is an example where the transmitter node (e.g., UE 120 and/or base station 110, among other examples) performs operations associated with adaptive transmission and transmission path selection based on a predicted channel state.

As shown in FIG. 7, in some aspects, process 700 may include predicting a future state associated with a wireless channel at a future time instance using a machine learning model, wherein the future state is predicted based at least in part on one or more of weights associated with the machine learning model, a current state associated with the wireless channel, or one or more previous states associated with the wireless channel (block 710). For example, the transmitter node (e.g., using communication manager 140/150 and/or prediction component 808, depicted in FIG. 8) may predict a future state associated with a wireless channel at a future time instance using a machine learning model, wherein the future state is predicted based at least in part on one or more of weights associated with the machine learning model, a current state associated with the wireless channel, or one or more previous states associated with the wireless channel, as described above.

As further shown in FIG. 7, in some aspects, process 700 may include selecting one or more parameters for a transmission to occur at the future time instance based at least in part on the future state associated with the wireless channel (block 720). For example, the transmitter node (e.g., using communication manager 140/150 and/or selection component 810, depicted in FIG. 8) may select one or more parameters for a transmission to occur at the future time instance based at least in part on the future state associated with the wireless channel, as described above.

As further shown in FIG. 7, in some aspects, process 700 may include performing the transmission using the one or more parameters (block 730). For example, the transmitter node (e.g., using communication manager 140/150 and/or transmission component 804, depicted in FIG. 8) may perform the transmission using the one or more parameters, as described above.

Process 700 may include additional aspects, such as any single aspect or any combination of aspects described below and/or in connection with one or more other processes described elsewhere herein.

In a first aspect, process 700 includes receiving, from an assisting wireless node, a periodic model update that indicates one or more architectural parameters associated with the machine learning model, wherein the future state is predicted based further on the one or more architectural parameters indicated in the periodic model update.

In a second aspect, alone or in combination with the first aspect, the current state or the one or more previous states associated with the wireless channel include one or more of a measurement associated with a received wireless signal, a number of sensed devices in a vicinity of the transmitter node, or a number of the sensed devices in the vicinity of the transmitter node that are moving at a speed that satisfies a threshold.

In a third aspect, alone or in combination with one or more of the first and second aspects, predicting the future state associated with the wireless channel includes providing, to the machine learning model at one or more layers, one or more inputs that relate to the current state associated with the wireless channel or the one or more previous states associated with the wireless channel, and obtaining, from the machine learning model, an output that indicates the future state associated with the wireless channel based at least in part on the weights and an activation function associated with the machine learning model at the one or more layers.

In a fourth aspect, alone or in combination with one or more of the first through third aspects, the one or more parameters for the transmission include one or more of a number of retransmissions, a modulation order, a code rate, a number of transmit antennas, a precoder, or a transmit power.

In a fifth aspect, alone or in combination with one or more of the first through fourth aspects, process 700 includes receiving, from an assisting wireless node, information configuring the machine learning model and one or more parameters for detecting a machine learning outage event, transmitting, to the assisting wireless node, a request to update the machine learning model based at least in part on detecting the machine learning outage event, and receiving, from the assisting wireless node, a model update that indicates one or more architectural parameters associated with the machine learning model based at least in part on the request, wherein the future state is predicted based further on the one or more architectural parameters indicated in the model update.

In a sixth aspect, alone or in combination with one or more of the first through fifth aspects, the one or more parameters for detecting the machine learning event include a mean channel prediction error over a time period or a number of packet transmissions that resulted in incorrect HARQ feedback.

In a seventh aspect, alone or in combination with one or more of the first through sixth aspects, the machine learning model indicates multiple transmission paths from the transmitter node to a destination node based at least in part on relative locations of the transmitter node, the destination node, and one or more intermediate nodes in a vicinity of the transmitter node or the destination node.

In an eighth aspect, alone or in combination with one or more of the first through seventh aspects, process 700 includes determining, of the multiple transmission paths, one or more transmission paths over which to perform the transmission based at least in part on the future state associated with the wireless channel at the future time instance.

In a ninth aspect, alone or in combination with one or more of the first through eighth aspects, the transmission is performed using a groupcast communication based at least in part on the one or more transmission paths including two or more of the multiple transmission paths.

In a tenth aspect, alone or in combination with one or more of the first through ninth aspects, the one or more transmission paths include at least one intermediate node predicted to be within a transmission range at the future time instance.

In an eleventh aspect, alone or in combination with one or more of the first through tenth aspects, the one or more transmission paths include one or more of a direct path to the destination node or an indirect path that traverses the one or more intermediate nodes.

In a twelfth aspect, alone or in combination with one or more of the first through eleventh aspects, process 700 includes receiving, from an assisting wireless node, a model update that indicates an update to the multiple transmission paths.

In a thirteenth aspect, alone or in combination with one or more of the first through twelfth aspects, process 700 includes receiving, from an assisting wireless node, information configuring the machine learning model based at least in part on the wireless channel having a semi-static configuration in which devices have fixed relative positions or predictable motion patterns.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
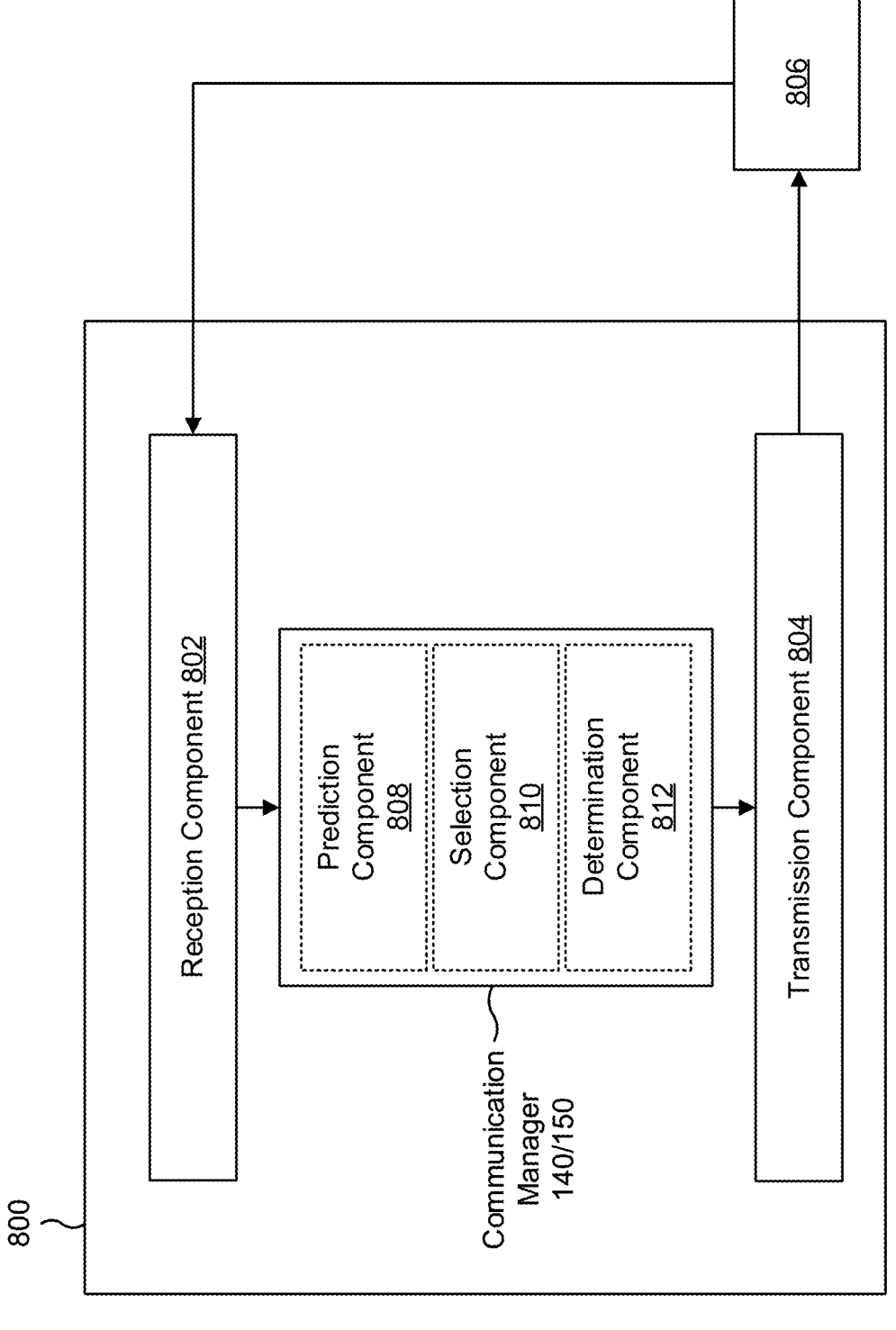
FIG. 8 is a diagram of an example apparatus for wireless communication, in accordance with the present disclosure.

FIG. 8 is a diagram of an example apparatus 800 for wireless communication. The apparatus 800 may be a transmitter node, or a transmitter node may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include the communication manager 140 and/or the communication manager 150 (shown in FIG. 8 and referred to herein as communication manager 140/150). The communication manager 140/150 may include one or more of a prediction component 808, a selection component 810, or a determination component 812, among other examples.

In some aspects, the apparatus 800 may be configured to perform one or more operations described herein in connection with FIGS. 4-6. Additionally, or alternatively, the apparatus 800 may be configured to perform one or more processes described herein, such as process 700 of FIG. 7. In some aspects, the apparatus 800 and/or one or more components shown in FIG. 8 may include one or more components of the UE or the base station described in connection with FIG. 2. Additionally, or alternatively, one or more components shown in FIG. 8 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 806. In some aspects, the reception component 802 may include one or more antennas, a modem, a demodulator, a MIMO detector, a receive processor, a controller/processor, a memory, or a combination thereof, of the UE or the base station described in connection with FIG. 2.

The transmission component 804 may transmit communications, such as reference signals, control information, data communications, or a combination thereof, to the apparatus 806. In some aspects, one or more other components of the apparatus 806 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modem, a modulator, a transmit MIMO processor, a transmit processor, a controller/processor, a memory, or a combination thereof, of the UE or the base station described in connection with FIG. 2. In some aspects, the transmission component 804 may be co-located with the reception component 802 in a transceiver.

The prediction component 808 may predict a future state associated with a wireless channel at a future time instance using a machine learning model, wherein the future state is predicted based at least in part on one or more of weights associated with the machine learning model, a current state associated with the wireless channel, or one or more previous states associated with the wireless channel. The selection component 810 may select one or more parameters for a transmission to occur at the future time instance based at least in part on the future state associated with the wireless channel. The transmission component 804 may perform the transmission using the one or more parameters.

The reception component 802 may receive, from an assisting wireless node, a periodic model update that indicates one or more architectural parameters associated with the machine learning model, wherein the future state is predicted based further on the one or more architectural parameters indicated in the periodic model update.

The reception component 802 may receive, from an assisting wireless node, information configuring the machine learning model and one or more parameters for detecting a machine learning outage event. The transmission component 804 may transmit, to the assisting wireless node, a request to update the machine learning model based at least in part on detecting the machine learning outage event. The reception component 802 may receive, from the assisting wireless node, a model update that indicates one or more architectural parameters associated with the machine learning model based at least in part on the request, wherein the future state is predicted based further on the one or more architectural parameters indicated in the model update.

The determination component 812 may determine, of the multiple transmission paths, one or more transmission paths over which to perform the transmission based at least in part on the future state associated with the wireless channel at the future time instance.

The reception component 802 may receive, from an assisting wireless node, a model update that indicates an update to the multiple transmission paths.

The reception component 802 may receive, from an assisting wireless node, information configuring the machine learning model based at least in part on the wireless channel having a semi-static configuration in which devices have fixed relative positions or predictable motion patterns.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

The following provides an overview of some Aspects of the present disclosure:

Aspect 1: A method of wireless communication performed by a transmitter node, comprising: predicting a future state associated with a wireless channel at a future time instance using a machine learning model, wherein the future state is predicted based at least in part on one or more of weights associated with the machine learning model, a current state associated with the wireless channel, or one or more previous states associated with the wireless channel; selecting one or more parameters for a transmission to occur at the future time instance based at least in part on the future state associated with the wireless channel; and performing the transmission using the one or more parameters.

Aspect 2: The method of Aspect 1, further comprising: receiving, from an assisting wireless node, a periodic model update that indicates one or more architectural parameters associated with the machine learning model, wherein the future state is predicted based further on the one or more architectural parameters indicated in the periodic model update.

Aspect 3: The method of any of Aspects 1-2, wherein the current state or the one or more previous states associated with the wireless channel include one or more of a measurement associated with a received wireless signal, a number of sensed devices in a vicinity of the transmitter node, or a number of the sensed devices in the vicinity of the transmitter node that are moving at a speed that satisfies a threshold.

Aspect 4: The method of any of Aspects 1-3, wherein predicting the future state associated with the wireless channel includes: providing, to the machine learning model at one or more layers, one or more inputs that relate to the current state associated with the wireless channel or the one or more previous states associated with the wireless channel; and obtaining, from the machine learning model, an output that indicates the future state associated with the wireless channel based at least in part on the weights and an activation function associated with the machine learning model at the one or more layers.

Aspect 5: The method of any of Aspects 1-4, wherein the one or more parameters for the transmission include one or more of a number of retransmissions, a modulation order, a code rate, a number of transmit antennas, a precoder, or a transmit power.

Aspect 6: The method of any of Aspects 1-5, further comprising: receiving, from an assisting wireless node, information configuring the machine learning model and one or more parameters for detecting a machine learning outage event; transmitting, to the assisting wireless node, a request to update the machine learning model based at least in part on detecting the machine learning outage event; and receiving, from the assisting wireless node, a model update that indicates one or more architectural parameters associated with the machine learning model based at least in part on the request, wherein the future state is predicted based further on the one or more architectural parameters indicated in the model update.

Aspect 7: The method of Aspect 6, wherein the one or more parameters for detecting the machine learning event include a mean channel prediction error over a time period or a number of packet transmissions that resulted in incorrect HARQ feedback.

Aspect 8: The method of any of Aspects 1-7, wherein the machine learning model indicates multiple transmission paths from the transmitter node to a destination node based at least in part on relative locations of the transmitter node, the destination node, and one or more intermediate nodes in a vicinity of the transmitter node or the destination node.

Aspect 9: The method of Aspect 8, further comprising: determining, of the multiple transmission paths, one or more transmission paths over which to perform the transmission based at least in part on the future state associated with the wireless channel at the future time instance.

Aspect 10: The method of Aspect 9, wherein the transmission is performed using a groupcast communication based at least in part on the one or more transmission paths including two or more of the multiple transmission paths.

Aspect 11: The method of any of Aspects 9-10, wherein the one or more transmission paths include at least one intermediate node predicted to be within a transmission range at the future time instance.

Aspect 12: The method of any of Aspects 9-11, wherein the one or more transmission paths include one or more of a direct path to the destination node or an indirect path that traverses the one or more intermediate nodes.

Aspect 13: The method of any of Aspects 8-12, further comprising: receiving, from an assisting wireless node, a model update that indicates an update to the multiple transmission paths.

Aspect 14: The method of any of Aspects 1-13, further comprising: receiving, from an assisting wireless node, information configuring the machine learning model based at least in part on the wireless channel having a semi-static configuration in which devices have fixed relative positions or predictable motion patterns.

Aspect 15: An apparatus for wireless communication at a device, comprising a processor; memory coupled with the processor; and instructions stored in the memory and executable by the processor to cause the apparatus to perform the method of one or more of Aspects 1-14.

Aspect 16: A device for wireless communication, comprising a memory and one or more processors coupled to the memory, the one or more processors configured to perform the method of one or more of Aspects 1-14.

Aspect 17: An apparatus for wireless communication, comprising at least one means for performing the method of one or more of Aspects 1-14.

Aspect 18: A non-transitory computer-readable medium storing code for wireless communication, the code comprising instructions executable by a processor to perform the method of one or more of Aspects 1-14.

Aspect 19: A non-transitory computer-readable medium storing a set of instructions for wireless communication, the set of instructions comprising one or more instructions that, when executed by one or more processors of a device, cause the device to perform the method of one or more of Aspects 1-14.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a transmitter node, comprising:

receiving, from an assisting wireless node, information configuring a machine learning model for predicting a future state associated with a wireless channel at a future time instance, wherein the information configuring the machine learning model comprises one or more weights associated with the machine learning model and one or more architectural parameters for the machine learning model;

receiving, from the assisting wireless node, one or more parameters for detecting a machine learning outage event, wherein the one or more parameters for detecting the machine learning outage event include a mean channel prediction error over a time period or a number of transmissions that resulted in incorrect hybrid automatic repeat request feedback;

transmitting, to the assisting wireless node, a request to update the machine learning model based at least in part on detecting the machine learning outage event in accordance with the one or more parameters for detecting the machine learning outage event;

receiving, from the assisting wireless node, one or more updates to the one or more architectural parameters associated with the machine learning model;

predicting the future state using the machine learning model associated with the one or more updates to the one or more architectural parameters associated with the machine learning model, and based at least in part on one or more inputs to the machine learning model, wherein the one or more inputs comprise a current state associated with the wireless channel or one or more previous states associated with the wireless channel;

selecting one or more parameters for a transmission to occur at the future time instance based at least in part on the future state associated with the wireless channel; and transmitting the transmission using the one or more parameters.

2. The method of claim 1, wherein the model update comprises a periodic model update.

3. The method of claim 1, wherein the current state or the one or more previous states associated with the wireless channel include one or more of a measurement associated with a received wireless signal, a number of sensed devices in a vicinity of the transmitter node, or a number of the sensed devices in the vicinity of the transmitter node that are moving at a speed that satisfies a threshold.

4. The method of claim 1, wherein predicting the future state associated with the wireless channel includes:

providing, to the machine learning model at one or more layers, one or more inputs that relate to the current state associated with the wireless channel or the one or more previous states associated with the wireless channel; and obtaining, from the machine learning model, an output that indicates the future state associated with the wireless channel based at least in part on the weights and an activation function associated with the machine learning model at the one or more layers.

5. The method of claim 1, wherein the one or more parameters for the transmission include one or more of a number of retransmissions of the transmission, a modulation order, a code rate, a number of transmit antennas, a precoder, or a transmit power.

6. The method of claim 1, further comprising:

receiving, from an assisting wireless node, information configuring the machine learning model based at least in part on the wireless channel having a semi-static configuration in which devices have fixed relative positions or predictable motion patterns.

7. The method of claim 1, wherein the one or more updates to one or more architectural parameters comprises one or more of: one or more updates to a number of layers associated with the machine learning model, one or more updates to one or more activation functions used in different layers of the machine learning model, one or more updates to one or more weights associated with different layers of the machine learning model, one or more updates to one or more drop out parameters associated with the machine learning model, one or more updates to one or more architectural connection parameters for one or more cell gates or forget gates associated with the machine learning model, or one or more updates to one or more inputs to an inference algorithm associated with the machine learning model.

8. The method of claim 1, wherein the wireless channel is between the transmitter node and a receiver node.

9. The method of claim 8, further comprising:

transmitting the transmission to the receiver node over the wireless channel.

10. The method of claim 8, wherein the wireless channel is a sidelink channel.

11. The method of claim 1, further comprising:

receiving, from the assisting wireless node, in accordance with the request, an update to the one or more parameters for detecting the machine learning outage event.

12. A transmitter node for wireless communication, comprising:

one or more memories; and one or more processors, coupled to the one or more memories, configured to:

receive, from an assisting wireless node, information to configure a machine learning model for predicting a future state associated with a wireless channel at a future time instance, wherein the information configuring the machine learning model comprises one or more weights associated with the machine learning model and one or more architectural parameters for the machine learning model;

receive, from the assisting wireless node, one or more parameters for detecting a machine learning outage event, wherein the one or more parameters for detecting the machine learning outage event include a mean channel prediction error over a time period or a number of transmissions that resulted in incorrect hybrid automatic repeat request feedback;

transmit, to the assisting wireless node, a request to update the machine learning model based at least in part on detecting the machine learning outage event in accordance with the one or more parameters for detecting the machine learning outage event;

receive, from the assisting wireless node, one or more updates to the one or more architectural parameters associated with the machine learning model;

predict the future state using the machine learning model associated with the one or more updates to the one or more architectural parameters associated with the machine learning model, and based at least in part on one or more inputs to the machine learning model, wherein the one or more inputs comprise a current state associated with the wireless channel or one or more previous states associated with the wireless channel;

select one or more parameters for a transmission to occur at the future time instance based at least in part on the future state associated with the wireless channel; and transmit the transmission using the one or more parameters.

13. The transmitter node of claim 12, wherein the model update comprises a periodic model update.

14. The transmitter node of claim 12, wherein the current state or the one or more previous states associated with the wireless channel include one or more of a measurement associated with a received wireless signal, a number of sensed devices in a vicinity of the transmitter node, or a number of the sensed devices in the vicinity of the transmitter node that are moving at a speed that satisfies a threshold.

15. The transmitter node of claim 12, wherein the one or more processors, to predict the future state associated with the wireless channel, are configured to:

provide, to the machine learning model at one or more layers, one or more inputs that relate to the current state associated with the wireless channel or the one or more previous states associated with the wireless channel; and obtain, from the machine learning model, an output that indicates the future state associated with the wireless channel based at least in part on the weights and an activation function associated with the machine learning model at the one or more layers.

16. The transmitter node of claim 12, wherein the one or more parameters for the transmission include one or more of a number of retransmissions of the transmission, a modulation order, a code rate, a number of transmit antennas, a precoder, or a transmit power.

17. The transmitter node of claim 12, wherein the one or more processors are further configured to:

receive, from an assisting wireless node, information configuring the machine learning model based at least in part on the wireless channel having a semi-static configuration in which devices have fixed relative positions or predictable motion patterns.

18. The transmitter node of claim 12, wherein the one or more updates to one or more architectural parameters comprises one or more of: one or more updates to a number of layers associated with the machine learning model, one or more updates to one or more activation functions used in different layers of the machine learning model, one or more updates to one or more weights associated with different layers of the machine learning model, one or more updates to one or more drop out parameters associated with the machine learning model, one or more updates to one or more architectural connection parameters for one or more cell gates or forget gates associated with the machine learning model, or one or more updates to one or more inputs to an inference algorithm associated with the machine learning model.

19. The transmitter node of claim 12, wherein the one or more processors are further configured to:

receive, from the assisting wireless node, in accordance with the request, an update to the one or more parameters for detecting the machine learning outage event.

20. A non-transitory computer-readable medium storing a set of instructions for wireless communication, the set of instructions comprising:

one or more instructions that, when executed by one or more processors of a transmitter node, cause the transmitter node to:

receive, from an assisting wireless node, information to configure a machine learning model for predicting a future state associated with a wireless channel at a future time instance, wherein the information configuring the machine learning model comprises one or more weights associated with the machine learning model and one or more architectural parameters for the machine learning model;

receive, from the assisting wireless node, one or more parameters for detecting a machine learning outage event, wherein the one or more parameters for detecting the machine learning outage event include a mean channel prediction error over a time period or a number of transmissions that resulted in incorrect hybrid automatic repeat request feedback;

transmit, to the assisting wireless node, a request to update the machine learning model based at least in part on detecting the machine learning outage event in accordance with the one or more parameters for detecting the machine learning outage event;

receive, from the assisting wireless node, one or more updates to the one or more architectural parameters associated with the machine learning model;

predict the future state using the machine learning model associated with the one or more updates to the one or more architectural parameters associated with the machine learning model, and based at least in part on one or more inputs to the machine learning model, wherein the one or more inputs comprise a current state associated with the wireless channel or one or more previous states associated with the wireless channel;

select one or more parameters for a transmission to occur at the future time instance based at least in part on the future state associated with the wireless channel; and transmit the transmission using the one or more parameters.

21. The non-transitory computer-readable medium of claim 20, wherein the model update comprises a periodic model update.

22. The non-transitory computer-readable medium of claim 20, wherein the current state or the one or more previous states associated with the wireless channel include one or more of a measurement associated with a received wireless signal, a number of sensed devices in a vicinity of the transmitter node, or a number of the sensed devices in the vicinity of the transmitter node that are moving at a speed that satisfies a threshold.

23. The non-transitory computer-readable medium of claim 20, wherein the one or more instructions, to predict the future state associated with the wireless channel, are further executable to cause the transmitter node to:

provide, to the machine learning model at one or more layers, one or more inputs that relate to the current state associated with the wireless channel or the one or more previous states associated with the wireless channel; and obtain, from the machine learning model, an output that indicates the future state associated with the wireless channel based at least in part on the weights and an activation function associated with the machine learning model at the one or more layers.

24. The non-transitory computer-readable medium of claim 20, wherein the one or more parameters for the transmission include one or more of a number of retransmissions of the transmission, a modulation order, a code rate, a number of transmit antennas, a precoder, or a transmit power.

25. The non-transitory computer-readable medium of claim 20, wherein the one or more instructions are further executable to cause the transmitter node to:

receive, from an assisting wireless node, information configuring the machine learning model based at least in part on the wireless channel having a semi-static configuration in which devices have fixed relative positions or predictable motion patterns.

26. The non-transitory computer-readable medium of claim 20, wherein the one or more updates to one or more architectural parameters comprises one or more of: one or more updates to a number of layers associated with the machine learning model, one or more updates to one or more activation functions used in different layers of the machine learning model, one or more updates to one or more weights associated with different layers of the machine learning model, one or more updates to one or more drop out parameters associated with the machine learning model, one or more updates to one or more architectural connection parameters for one or more cell gates or forget gates associated with the machine learning model, or one or more updates to one or more inputs to an inference algorithm associated with the machine learning model.

27. An apparatus for wireless communication, comprising:

means for receiving, from an assisting wireless node, information configuring a machine learning model for predicting a future state associated with a wireless channel at a future time instance, wherein the information configuring the machine learning model comprises one or more weights associated with the machine learning model and one or more architectural parameters for the machine learning model;

means for receiving, from the assisting wireless node, one or more parameters for detecting a machine learning outage event, wherein the one or more parameters for detecting the machine learning outage event include a mean channel prediction error over a time period or a number of transmissions that resulted in incorrect hybrid automatic repeat request feedback;

means for transmitting, to the assisting wireless node, a request to update the machine learning model based at least in part on detecting the machine learning outage event in accordance with the one or more parameters for detecting the machine learning outage event;

means for receiving, from the assisting wireless node, one or more updates to the one or more architectural parameters associated with the machine learning model;

means for predicting the future state using the machine learning model associated with the one or more updates to the one or more architectural parameters associated with the machine learning model, and based at least in part on one or more inputs to the machine learning model, wherein the one or more inputs comprise a current state associated with the wireless channel or one or more previous states associated with the wireless channel;

means for selecting one or more parameters for a transmission to occur at the future time instance based at least in part on the future state associated with the wireless channel; and means for transmitting the transmission using the one or more parameters.

28. The apparatus of claim 27, wherein the model update comprises a periodic model update.

29. The apparatus of claim 27, wherein the current state or the one or more previous states associated with the wireless channel include one or more of a measurement associated with a received wireless signal, a number of sensed devices in a vicinity of the apparatus, or a number of the sensed devices in the vicinity of the apparatus that are moving at a speed that satisfies a threshold.

30. The non-transitory computer-readable medium of claim 20, wherein the one or more instructions are further executable to cause the transmitter node to:

receive, from the assisting wireless node, in accordance with the request, an update to the one or more parameters for detecting the machine learning outage event.

\* \* \* \* \*